(No Model.)
J. T. KING & S. H. TRUITT.
HARVESTING OR PLANTING POUCH.
No. 516,097. Patented Mar. 6, 1894.
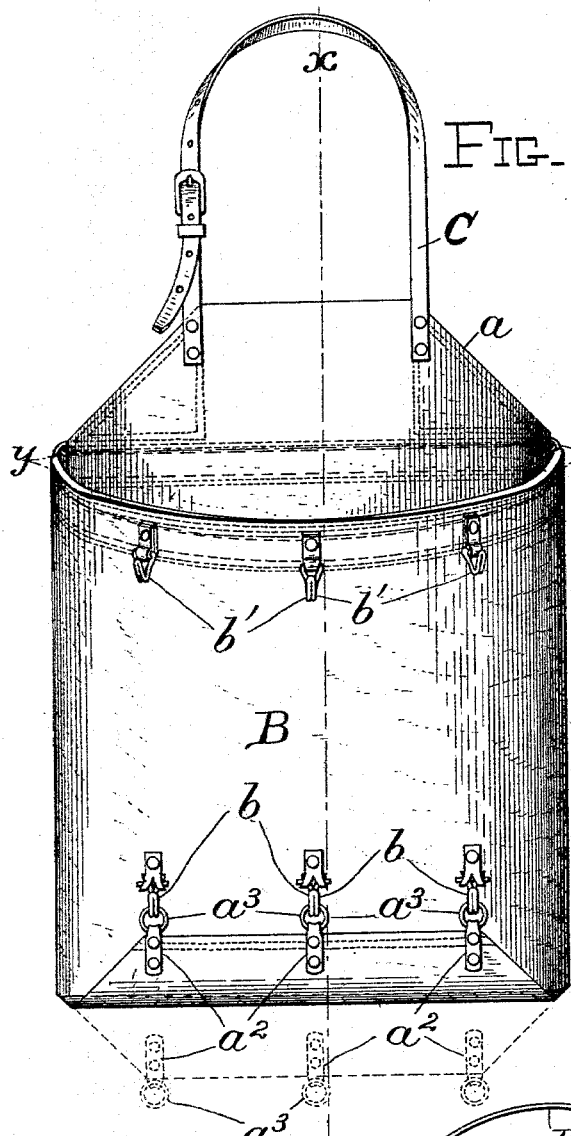
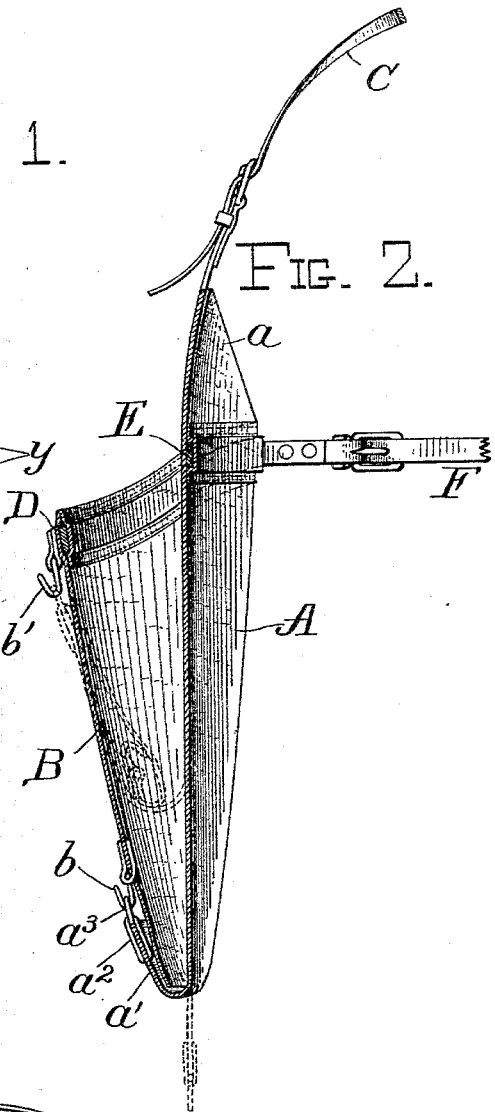
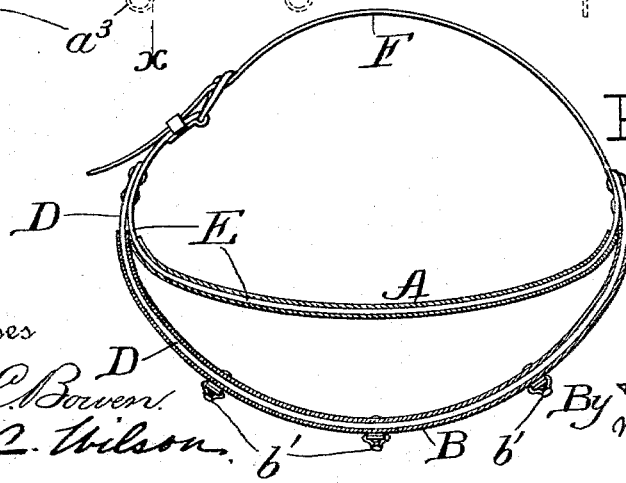

UNITED STATES PATENT OFFICE.

JOHN T. KING AND SHORTER H. TRUITT, OF LA GRANGE, GEORGIA.

HARVESTING OR PLANTING POUCH.

SPECIFICATION forming part of Letters Patent No. 516,097, dated March 6, 1894.

Application filed June 10, 1893. Serial No. 477,231. (No model.)

*To all whom it may concern:*

Be it known that we, JOHN T. KING and SHORTER H. TRUITT, citizens of the United States, residing at La Grange, in the county of Troup and State of Georgia, have invented certain new and useful Improvements in Harvesting or Planting Pouches; and we do hereby declare the following to be a full, clear, and exact description of the invention, such as will enable others skilled in the art to which it appertains to make and use the same.

Our invention relates to improvements in bags or pouches for harvesting cotton, peas, and other similar products, and also for carrying grains or other seeds to be sown.

It consists of certain novel features hereinafter described and claimed.

Reference is had to the accompanying drawings in which the same parts are indicated by the same letters throughout the several views.

Figure 1 represents a view of the improved bag or pouch, as seen from the front thereof. Fig. 2 represents a section along the line $x\ x$ of Fig. 1; and Fig. 3 represents a section made by the plane $y\ y$ of Fig. 1.

A represents the rear or inner portion of the pouch provided with a tab $a$ to which the supporting strap C is attached; and also with a flap $a'$ to which a plurality of straps $a^2$ are riveted, the said straps carrying at their end, rings $a^3$.

B represents the front of the bag or pouch, which may either be made integral with or may be sewed on to the rear portion A of the bag. This front portion B is provided with a plurality of hooks, $b$ and $b'$, which are arranged in two or more parallel rows. These hooks are adapted to engage in the eyes $a^3$, and so to support the flap $a'$ which forms the bottom of the bag. If the rings $a^3$ be hooked in the lower hook $b$, the bag will be long or deep, as shown in Figs. 1 and 2, and if the rings be hooked in the upper row of hooks, the bag will be shallow as indicated in dotted lines in Fig. 2.

In picking cotton and peas, it will ordinarily be preferable to have the bag long and deep so as to hold a large quantity of the product; while in using the bag for planting purposes as for planting corn, it would ordinarily be preferable to have the bag shallow so that the seeds might be conveniently reached by the hand. The upper part of the bag is provided with a resilient collar made of two straps D and E, which add stiffness and strength to the bag, and at the same time keep the mouth of the bag open at all times, and thus render it convenient to drop the gathered product therein or to reach down in the bag and withdraw seed therefrom. In the sacks ordinarily used for similar purposes the mouth of the sack ordinarily closes and has to be opened by hand each time that it is desired either to put anything into the sack or to take anything out of the sack. These straps D and E are preferably made of stiff leather, but they may be made of hoop iron or steel or any other suitable material, having the requisite stiffness and resiliency.

Attached to the ends of the straps D and E, or made integral with either one of them, we provide a strap F which goes around the body of the wearer and steadies the bag in position. The bag is intended to be suspended from the shoulders of the wearer by the strap C. When it is desired to empty the bag, the rings $a^3$ are simply unhooked, the flap $a'$ is let fall, and the contents of the bag either fall out by their own weight, or may be pushed out readily by hand.

Having thus described our invention, what we claim, and desire to secure by Letters Patent of the United States, is—

A sack for harvesting cotton, peas and the like, or for planting grain, provided with an open bottom, a flap $a'$ adapted to close the same, hooks $b$ and $b'$ in parallel rows, rings $a^3$ attached to said flap $a'$, and adapted to engage in said hooks, straps D and E made of stiff resilient material and adapted to keep the mouth of said sack open, steadying strap F, and supporting strap C, substantially as and for the purposes described.

In testimony whereof we affix our signatures in presence of two witnesses.

JOHN T. KING.
SHORTER H. TRUITT.

Witnesses:
C. V. TRUITT,
T. H. CAUDLE.